(12) United States Patent
Sato et al.

(10) Patent No.: US 10,769,479 B2
(45) Date of Patent: Sep. 8, 2020

(54) RECOGNITION SYSTEM, GENERIC-FEATURE EXTRACTION UNIT, AND RECOGNITION SYSTEM CONFIGURATION METHOD

(71) Applicant: Denso IT Laboratory, Inc., Tokyo (JP)

(72) Inventors: Ikuro Sato, Tokyo (JP); Mitsuru Ambai, Tokyo (JP); Hiroshi Doi, Tokyo (JP)

(73) Assignee: DENSO IT LABORATORY, INC., Tokyo (JP)

( * ) Notice: Subject to any disclaimer, the term of this patent is extended or adjusted under 35 U.S.C. 154(b) by 203 days.

(21) Appl. No.: 15/947,009

(22) Filed: Apr. 6, 2018

(65) Prior Publication Data

US 2018/0336430 A1 Nov. 22, 2018

(30) Foreign Application Priority Data

May 18, 2017 (JP) ................................ 2017-098641

(51) Int. Cl.
*G06K 9/00* (2006.01)
*G06K 9/46* (2006.01)
*G06K 9/62* (2006.01)
*G06N 3/04* (2006.01)
*G06N 3/063* (2006.01)
*G06N 3/08* (2006.01)
(Continued)

(52) U.S. Cl.
CPC ............... *G06K 9/46* (2013.01); *G06K 9/209* (2013.01); *G06K 9/6257* (2013.01); *G06N 3/0454* (2013.01); *G06N 3/0481* (2013.01); *G06N 3/063* (2013.01); *G06N 3/084* (2013.01); *G06T 7/10* (2017.01); *G06T 2207/20084* (2013.01)

(58) Field of Classification Search
None
See application file for complete search history.

(56) References Cited

U.S. PATENT DOCUMENTS 7,496,547 B2 * 2/2009 Abdulkader ....... G06K 9/00429
706/20
8,538,636 B2 * 9/2013 Breed ................... B60N 2/002
315/77

(Continued)

OTHER PUBLICATIONS

Kokkinos, "UberNet: Training a 'Universal' Convolutional Neural Network for Low-, Mid-, and High-Level Vision using Diverse Datasets and Limited Memory", CentraleSupelec—INRIA, Sep. 7, 2016, pp. 1-19.

(Continued)

*Primary Examiner* — Hadi Akhavannik
(74) *Attorney, Agent, or Firm* — Pearne & Gordon LLP

(57) ABSTRACT

A recognition system includes: a sensor processing unit (SPU) that performs sensing to output a sensor value; a task-specific unit (TSU) including an object detection part that performs an object detection task based on the sensor value and a semantic segmentation part that performs a semantic segmentation task based on the sensor value; and a generic-feature extraction part (GEU) including a generic neural network disposed between the sensor processing unit and the task-specific unit, the generic neural network being configured to receive the sensor value as an input to extract a generic feature to be input in common into the object detection part and the semantic segmentation part.

16 Claims, 3 Drawing Sheets

(51) Int. Cl.
*G06T 7/10* (2017.01)
*G06K 9/20* (2006.01)

(56) References Cited

U.S. PATENT DOCUMENTS

| | | | | |
|---|---|---|---|---|
| 2015/0117760 A1* | 4/2015 | Wang | ........................ | G06K 9/66 |
| | | | | 382/157 |
| 2015/0178619 A1* | 6/2015 | Nishitani | ................. | G06N 3/04 |
| | | | | 706/25 |
| 2015/0306761 A1* | 10/2015 | O'Connor | .............. | G06N 3/008 |
| | | | | 700/250 |
| 2016/0086050 A1* | 3/2016 | Piekniewski | ........ | G06K 9/4671 |
| | | | | 382/103 |
| 2016/0093048 A1* | 3/2016 | Cheng | ................. | G06K 9/6289 |
| | | | | 382/131 |
| 2016/0247290 A1* | 8/2016 | Liu | ....................... | G06K 9/4604 |
| 2016/0300485 A1* | 10/2016 | Ayvaci | ............... | G06K 9/00805 |
| 2016/0358337 A1* | 12/2016 | Dai | ........................... | G06T 5/10 |
| 2017/0083796 A1* | 3/2017 | Kim | .................... | G06K 9/00369 |

OTHER PUBLICATIONS

Tadashi, et al., "Hardware Implementation of Neural Network and Approach to Systemization", Journal of the Japan Neuronal Circuit Society, vol. 20, No. 4, 2013, pp. 166-173.
Tanaka, et al., "A Technique for Hardware Implementation of Neural Networks using FPGA" Dept. of Electrical and Computer Eng., Nagoya Institute of Technology, Mar. 2001, pp. 1-17.
Akiyama, "Neural Network Hardware", Japan Operations Research Society, Jul. 1992, pp. 1-11.

* cited by examiner

RECOGNITION SYSTEM, GENERIC-FEATURE EXTRACTION UNIT, AND RECOGNITION SYSTEM CONFIGURATION METHOD

CROSS REFERENCE TO RELATED APPLICATION

This nonprovisional application is based on Japanese Patent Application No. 2017-098641 filed with the Japan Patent Office on May 18, 2017, the entire contents of which are hereby incorporated by reference.

FIELD

The present disclosure relates to a recognition system that performs recognition processing on the basis of a sensor value, a generic-feature extraction unit to be used in the recognition system, and a recognition system configuration method.

BACKGROUND AND SUMMARY

As a recognition system that performs recognition processing on the basis of a sensor value, a recognition system that acquires a feature from a sensor value with a machine learning model, such as a neural network, to perform recognition, has been known (e.g., Iasonas Kokkinos, "Uber-Net: Training a 'Universal' Convolutional Neural Network for Low-, Mid-, and High-Level Vision using Diverse Datasets and Limited Memory", arXiv:1609.02132v1 [cs.CV], 7 Sep. 2016). The recognition system is applied to vehicle driving control, such as vehicle automated drive or driver assistance.

The vehicle driving control includes: acquiring, for example, an image of a camera or a detected value of a millimeter wave radar, as a sensor value; inputting the sensor value into a machine learning model, such as a neural network, to acquire a result such as sign identification, pedestrian detection, or white-line detection; and controlling the vehicle on the basis of the recognition result (namely, the output of the machine learning model). Examples of the control of the vehicle include speed limiting based on the result of the sign identification, autonomous emergency braking based on the result of the pedestrian detection, and lane keeping based on the result of the white-line detection.

For example, recognition processing is performed to an image (shot image) shot and acquired by the camera, for any of the sign recognition, the pedestrian detection, and the white-line detection. Inputting the shot image into a learned neural network configured for the sign identification, acquires the result of the sign identification; inputting the shot image into a learned neural network configured for the pedestrian detection, acquires the result of the pedestrian detection; and inputting the shot image into a learned neural network configured for the white-line detection, acquires the result of the white-line detection.

A large amount of learning data are required in order to acquire a high-precision neural network, and additionally a long computing time is required for the neural network to learn a large amount of prepared learning data. Conventionally, it is necessary to prepare a plurality of such neural networks for recognition tasks (e.g., sign identification, pedestrian detection, and white-line detection), and thus development costs (including expense costs, time costs, and work burden costs) are large and updating costs for updating the recognition system are large.

Particularly, in a system of performing a large number of recognition tasks to acquire a vehicular control value as for a vehicle that performs automated drive and driver assistance, for example, the same shot image is used for the plurality of recognition tasks and similar feature extraction computing is performed to the shot image in each of the recognition tasks, but an independent neural network is prepared for each of the recognition tasks.

An object of the present disclosure is to reduce development costs in a recognition system that performs recognition with a neural network that receives a sensor value as an input.

A recognition system according to one aspect of the present disclosure, includes: a sensing unit configured to perform sensing to output a sensor value; a task-specific unit including a first recognition processing part that performs a first recognition task based on the sensor value and a second recognition processing part that performs a second recognition task based on the sensor value; and a generic-feature extraction unit including a generic neural network disposed between the sensing unit and the task-specific unit, the generic neural network being configured to receive the sensor value as an input to extract a generic feature to be input in common into the first recognition processing part and the second recognition processing part.

With this configuration, the extraction of the generic feature to be used in common between the first recognition task and the second recognition task, can be performed with the generic neural network, and thus development costs can be reduced.

The generic-feature extraction unit may be provided on a semiconductor chip different from a semiconductor chip on which the task-specific unit is provided.

With this configuration, the generic-feature extraction unit and the task-specific unit can be separately developed and thus development management costs can be reduced.

The generic neural network in the generic-feature extraction unit may include hardware on the semiconductor chip.

With this configuration, the extraction of the generic feature in the generic-feature extraction unit can be performed with low power consumption and a low heating value at high speed. Note that, when the generic neural network includes the hardware, there is an increase in cost in updating the generic neural network, but implementation of each of the parts in the task-specific unit with software and updating of each of the parts in the task-specific unit allow the recognition system to be updated with inhibition in cost.

The first recognition processing part may include a neural network for the first recognition task that receives, as an input, the generic feature output from the generic-feature extraction unit to output a result of the first recognition task.

With this configuration, the recognition result of the first recognition task can be acquired from the sensor value with the generic neural network and the neural network for the first recognition task in series.

The sensing unit may include a sensor that acquires the sensor value and a preprocessing part that performs preprocessing to the sensor value.

With this configuration, the preprocessing part can acquire the sensor value to be appropriately input into the generic neural network.

The generic-feature extraction unit may include a discrete device that resolves the input to each layer of the generic neural network, into integer bases.

With this configuration, the extraction of the generic feature can be performed at high speed.

The generic neural network may have an integer weight.

With this configuration, the extraction of the generic feature can be also performed at high speed.

The generic-feature extraction unit may include a discrete device that resolves the input to each layer of the generic neural network, into integer bases, and the generic neural network may retain a weight discretized having binary numbers or ternary numbers, the generic neural network being configured to perform the entirety or part of internal computing with a logic operation, the generic neural network being configured to transform a result of the logic operation with a non-linear activating function, the generic neural network being configured to give a result of the transformation to a next layer.

With this configuration, the extraction of the generic feature can be also performed at high speed.

The generic-feature extraction unit may include a communication module or may be connected to the communication module, the generic-feature extraction unit being configured to update the weight of the generic neural network, based on information received by the communication module.

With this configuration, the weight of the generic neural network in the generic-feature extraction unit can be remotely updated in communication.

A generic-feature extraction unit according to one aspect of the present disclosure, includes: a generic neural network disposed between a sensing unit and a task-specific unit, the sensing unit being configured to perform sensing to output a sensor value, the task-specific unit including a first recognition processing part that performs a first recognition task based on the sensor value and a second recognition processing part that performs a second recognition task based on the sensor value, the generic neural network being configured to receive the sensor value as an input to extract a generic feature to be used in common between the first recognition processing part and the second recognition processing part.

With this configuration, the generic feature to be used for the first recognition task and the second recognition task can be calculated with the generic neural network, and thus the scale of a computing device as the entire system can be reduced and development costs can be reduced in comparison to a configuration in which the first recognition task and the second recognition task can be performed without the generic feature between the tasks.

A recognition system configuration method of configuring the recognition system, according to one aspect of the present disclosure, includes: causing the generic neural network to learn with, as learning data sets, input data and output data of a learned recognition device that performs the first recognition task and input data and output data of a learned recognition device that performs the second recognition task.

A large amount of learning data set is required for the generic neural network learning (specifically, for determining a weight parameter). According to the present recognition system, the generic-feature extraction unit performs at least part of the feature extraction, and the task-specific unit outputs the respective recognition results of the first recognition task and the second recognition task. Thus, a learning data set for the first recognition task and a learning data set for the second recognition task are required in order to cause the generic neural network to learn. It may be difficult to prepare a learning data set depending on the type of a recognition task, but according to the configuration, the input data and the output data of the learned recognition device that performs the first recognition task and the input data and the output data of the learned recognition device that performs the second recognition task, are used as the learning data sets. Such a learned recognition device can be easily available, so that a learning data set can be easily acquired for causing the generic neural network to learn. In this manner, the use of the learning data set for the first recognition task and the learning data set of the second recognition task allows of end-to-end learning including the generic neural network, for the recognition tasks, so that the generic neural network can learn to adapt to both of the first recognition task and the second recognition task.

An ensemble recognition device that unifies recognition results of a plurality of recognition devices to acquire the output data, may be used as each of the recognition devices.

With this arrangement, a higher-precision learning data set can be acquired.

A recognition system configuration method of configuring the recognition system, according to one aspect of the present disclosure, includes: causing the neural network for the first recognition task to learn with, as a learning data set, input data and output data of a learned recognition device that performs the first recognition task.

With this configuration, the learning data set for the neural network for the first recognition task is easily acquired.

An ensemble recognition device that unifies recognition results of a plurality of recognition devices to acquire the output data, may be used as the recognition device.

With this configuration, a higher-precision learning data set can be acquired.

A recognition system configuration method of configuring the recognition system, according to one aspect of the present disclosure, includes: changing a structure of the generic neural network to cause a relationship between the input into the generic neural network and the output from the neural network for the first recognition task, to further approximate to a relationship between an input and an output of a learned recognition device that performs the first recognition task, and to cause a relationship between the input into the generic neural network and an output from a neural network for the second recognition task, to further approximate to a relationship between an input and an output of a learned recognition device that performs the second recognition task.

With this configuration, the structure of the generic neural network is changed such that the approximation to the existing learned recognition devices is made.

A recognition system configuration method of configuring the recognition system, according to one aspect of the present disclosure, includes: changing a structure of the neural network for the first recognition task, to cause a relationship between the input into the generic neural network and the output from the neural network for the first recognition task, to further approximate to a relationship between an input and an output of a learned recognition device that performs the first recognition task.

With this configuration, the structure of the neural network for the first recognition task is changed such that the approximation to the existing learned recognition device is made.

According to the present disclosure, the extraction of the generic feature to be used in common for the first recognition task and the second recognition task can be performed with the generic neural network, so that the development costs can be reduced.

The foregoing and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

A recognition system according to an embodiment of the present disclosure will be described below with reference to the drawings. Note that the embodiment to be described below indicates an example in a case where the present disclosure is carried out, and thus the present disclosure is not limited to specific configurations to be described below. A specific configuration appropriate to the embodiment may be appropriately adopted in carrying out the present disclosure.

The recognition system according to the present embodiment, performs recognition processing for controlling a vehicle, the recognition system being mounted on the vehicle. A result of the recognition processing is used in order to acquire a control value for controlling the vehicle. The control with the control value allows the vehicle to perform automated drive or various types of driver assistance.

Figure 1:
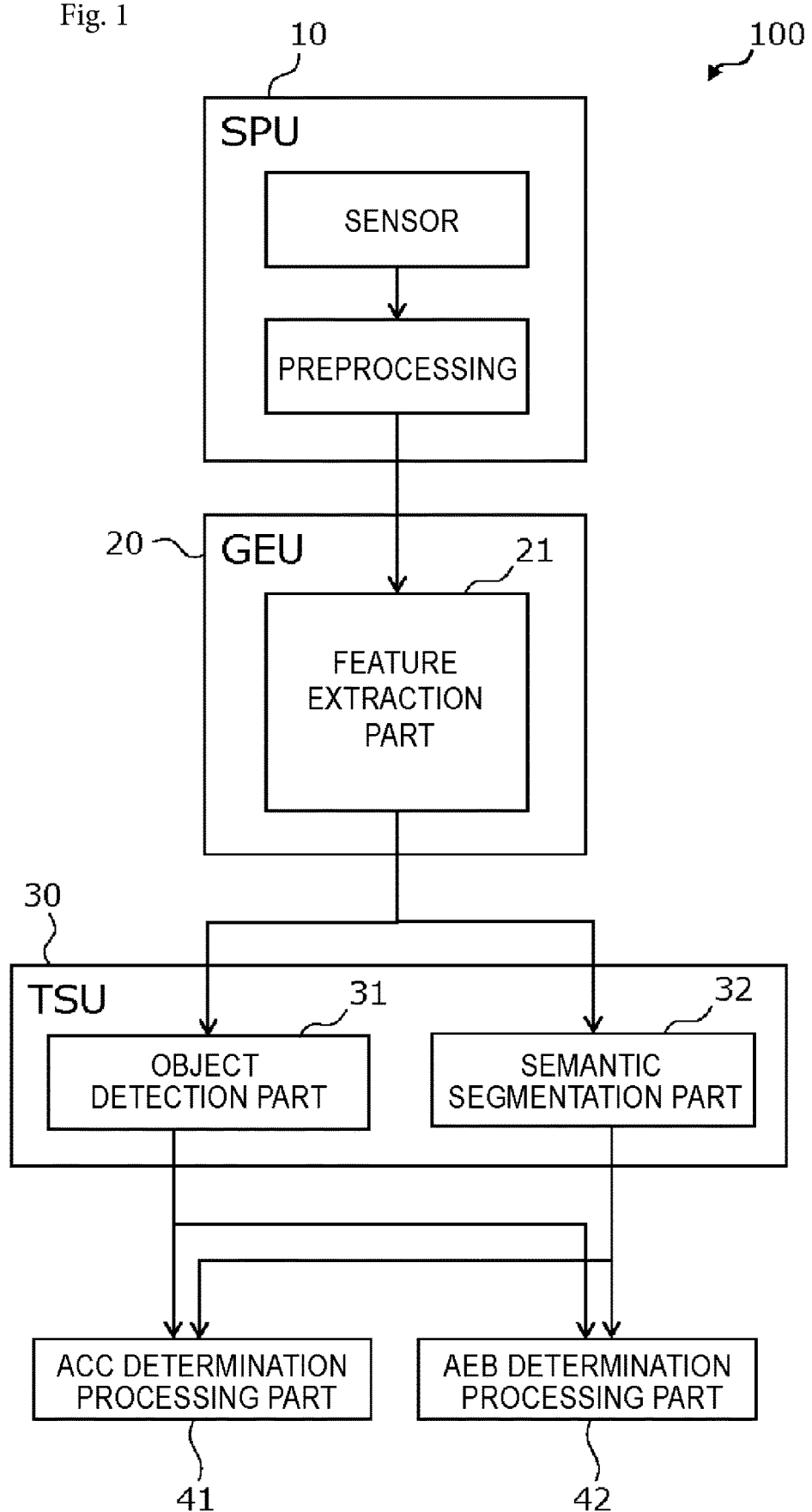
FIG. 1 is a block diagram of the configuration of a recognition system according to an embodiment.

FIG. 1 is a block diagram of the configuration of the recognition system according to the embodiment. The recognition system 100 includes a sensor processing unit (SPU) 10, a generic-feature extraction unit (GEU) 20, and a task-specific unit (TSU) 30.

The SPU 10 includes a sensor 11 that performs sensing to acquire a sensor value, and a preprocessing part 12 that performs preprocessing to the sensor value acquired by the sensor 11 to encode the sensor value into a format appropriate to an input into a feature extraction part 21. The preprocessing part 12 may perform, as preprocessing, processing of synchronizing a sensor cycle with the cycle of a different processor, processing of extracting a statistic or a feature from the time-series sensor value, or processing of reducing the amount of data.

According to the present embodiment, the sensor 11 is a monocular camera and acquires shot image data including data of the amounts of received light two-dimensionally arranged, as the sensor value. The preprocessing part 12 converts the shot image data into an MPEG format and performs buffering to the plurality of frames of shot image data to be arranged on a time-series basis, so that time-series shot image data is generated. The sensor 11 is provided to the vehicle in order to shoot ahead of the vehicle.

The GEU 20 includes the feature extraction part 21 that extracts a feature from the sensor value acquired by the SPU 10. The GEU 20 is provided on a semiconductor chip different from those of the SPU 10 and the TSU 30. The feature extraction part 21 includes a neural network. The neural network is configured with a hardware circuit. Various techniques have been proposed for hardware implementation of such a neural network (e.g., refer to Hakaru Tamukoh and Masatoshi Sekine, "Hardware/Software Complex System for Neural Network Implementation", The Brain & Neural Networks, Vol. 20, No. 4 (2013), pp. 166-173, Yoshihisa Tanaka, Susumu Kuroyanagi, and Akira Iwata, "A Technique for Hardware Implementation of Neural Networks using FPGA", IEICE Technical Report, NC, Neurocomputing, 100 (688), pp. 175-182, 16 Mar. 2001, IEICE, and Yutaka Akiyama, "Hardware of Neural Networks", Operations Research, July issue (1992), pp. 342-346).

The feature extraction part 21 outputs the feature as the output of the neural network, to an object detection part 31 and a semantic segmentation part 32 in the TSU 30. In this manner, since the feature output by the feature extraction part 21 is used in common between the object detection part 31 and the semantic segmentation part 32, the feature is also referred to as a generic feature and the neural network implemented in the feature extraction part 21 is also referred to as a generic neural network, in the present specification.

Figure 2:
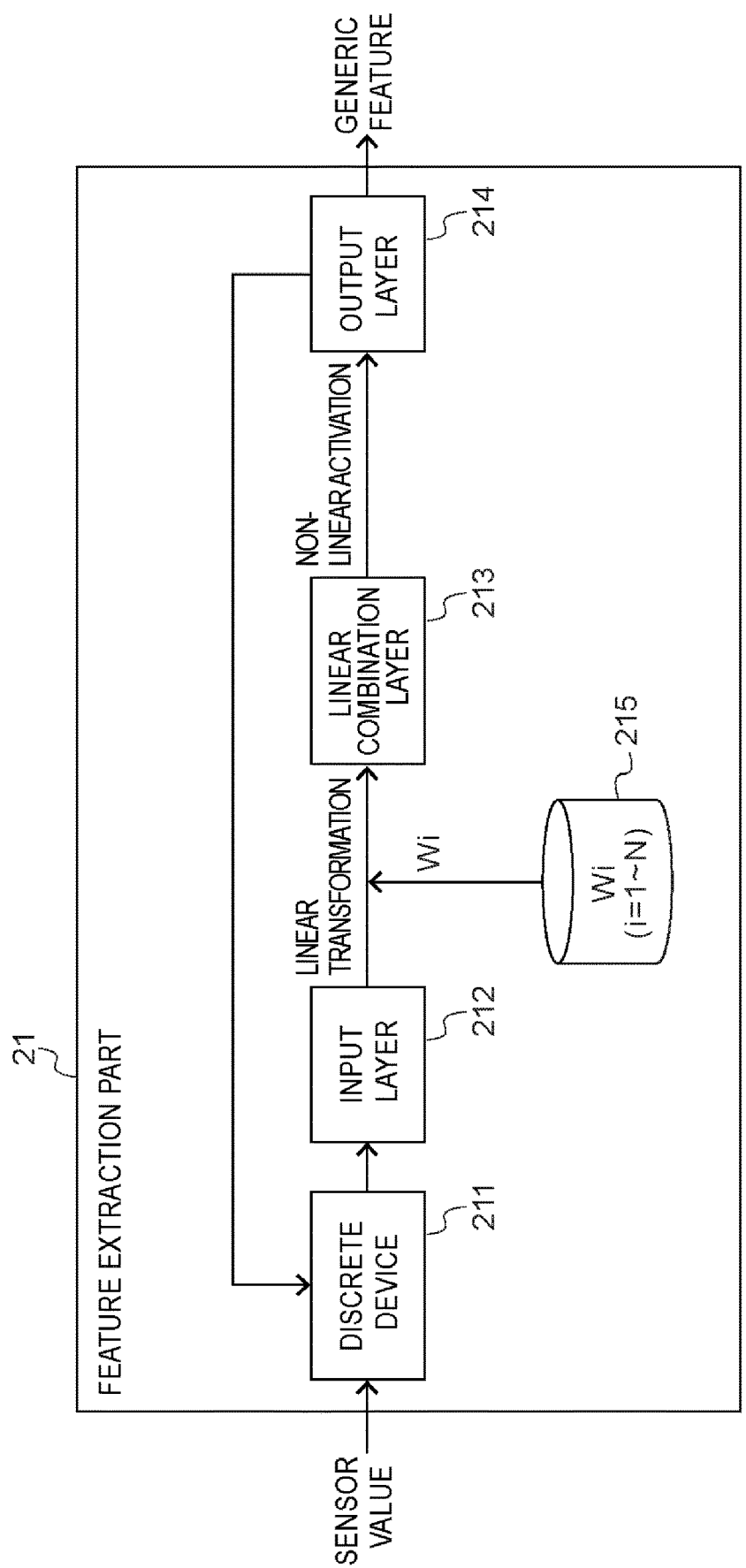
FIG. 2 is a block diagram of a hardware circuit of a feature extraction part according to the embodiment.

FIG. 2 is a block diagram of the hardware circuit of the feature extraction part 21. As illustrated in FIG. 2, the feature extraction part 21 includes a discrete device 211, an input layer 212, a linear combination layer 213, an output layer 214, and a weight storage part 215. The weight storage part 215 stores a weight vector $w_i$ (i=1 to N) for each layer in the generic neural network. Here, the N corresponds to the depth of the layers (hierarchical number) in the generic neural network.

The sensor value from the SPU 10 is first input into the discrete device 211. The discrete device 211 resolves the sensor value into integer bases to perform discretization, so that the input layer 212 is acquired. Linear transformation is performed to the input layer 212 with the weight vector $w_i$ in the weight storage part 215, so that the linear combination layer 213 is acquired as weighting addition. The linear combination layer 213 is input into a non-linear activating function (e.g., a sigmoid function) and then non-linear activation is performed, so that the output layer 214 is acquired. The components of a vector acquired as the output layer 214 are acquired as a floating-point number by the non-linear activation. The output layer 214 returns to the discrete device 211, and the discrete device 211 resolves the output layer 214 into the integer bases, again. This process is repeated N times (N layers) from i=1 to i=N, and then the feature extraction part 21 outputs the finally acquired output layer 214 as the generic feature.

In the weight storage part 215, the weight vector $w_i$ is an integer vector, and the element of the vector is preferably discretized into binary numbers (e.g., 0 and 1) or ternary numbers (e.g., −1, 0, and 1). As described above, the discrete device 211 resolves the value to be input, into the integer bases. In this manner, reducing the bit length of the feature handled in the generic neural network (e.g., 8 bits), can reduce a computing load. In addition, the generic neural network configured with the hardware circuit, allows the feature extraction part 21 to extract the generic feature at high speed. Furthermore, power consumption in the feature extraction part 21 can be inhibited low and a heating value can be also inhibited. Particularly, the weight vector $w_i$ being the vector having the binary numbers or the ternary numbers, allows the entirety or part of the computing in the feature extraction part 21, to be processed with a logic operation, so that advantages such as a further reduction in the computing load, an increase in the speed of the computing, a reduction in the power consumption, and a reduction in the low heating value, can be acquired.

The GEU 20 may include a communication module, not illustrated, or may be connected to the communication module. In this case, the communication module may perform radio communication. As described above, since the feature extraction part 21 includes the hardware circuit, the structure of the generic neural network configured with the hardware circuit is not allowed to be changed, but the weight vector $w_i$ stored in the weight storage part 215 can be updated. For example, when the TSU 30 is updated such that a new task using the generic feature is added, the weight of the generic neural network can be updated in accordance with the updating.

According to the present embodiment, the TSU 30 includes, as a plurality of recognition processing parts, the object detection part 31 and the semantic segmentation part 32. Recognition processing in each of the recognition processing parts (according to the present embodiment, object detection and semantic segmentation), is referred to as a "specific recognition task" in the present specification. The specific recognition tasks in the plurality of recognition processing parts in the TSU 30 (according to the present embodiment, the object detection part 31 and the semantic segmentation part 32) are different from each other, but the object detection part 31 and the semantic segmentation part 32 each include a neural network that receives, as an input, the generic feature extracted by the GEU 20.

The neural network implemented as the object detection part 31, outputs a result of the object detection, and this is referred to as a neural network for object detection in the present specification. The neural network implemented as the semantic segmentation part 32, outputs a result of the semantic segmentation, and this is referred to as a neural network for semantic segmentation in the present specification.

The generic neural network in the feature extraction part 21 and the neural network for object detection in the object detection part 31 are connected in series, so that a neural network is configured to acquire the result of the object detection from the sensor value (the shot image data). The generic neural network in the feature extraction part 21 and the neural network for semantic segmentation in the semantic segmentation part 32 are connected in series, so that a neural network is configured to acquire the result of the semantic segmentation from the sensor value (the shot image data).

The object detection part 31 detects a person (a pedestrian) and a vehicle to output, as a recognition result, a rectangular frame surrounding the person (the pedestrian) and a rectangular frame surrounding the vehicle, to the shot image data. The data of the rectangular frame surrounding the person is denoted with a label indicating the person, and the data of the rectangular frame surrounding the vehicle is denoted with a label indicating the vehicle. The semantic segmentation part 32 segments the shot image data into regions each corresponding to the semantics (type) of a subject, with semantic segmentation, and outputs information regarding the regions each segmented corresponding to the semantics of the subject. Each of the regions is denoted with a label indicating the semantics of the subject.

The TSU 30 includes a general-purpose processor, and the neural network for object detection in the object detection part 31 and the neural network for semantic segmentation in the semantic segmentation part 32 each include software. In this manner, the recognition processing parts dedicated to the specific recognition tasks (according to the present embodiment, the object detection task and the semantic segmentation task) each are achieved by the software with the general-purpose processor, and thus when a new neural network better for each of the tasks is acquired, the software is updated, so that the new neural network can be adopted at low cost.

That is, as described above, since the feature extraction part 21 for acquiring the generic feature includes the hardware circuit, the neural network structure is not allowed to be changed after shipping, but the recognition processing parts that each perform the processing dedicated to the specific recognition task, each include the software and thus the recognition processing parts can be updated at low cost.

The TSU 30 may include a communication module, not illustrated, or may be connected to the communication module. In this case, the communication module may perform radio communication. The neural network for object detection in the object detection part 31 and the neural network for semantic segmentation in the semantic segmentation part 32 each may be updated or replaced with data received through the communication module.

The respective recognition results of the object detection part 31 and the semantic segmentation part 32 are input into an active clues control (ACC) determination processing part 41 that performs processing of determining active clues control. The respective recognition results of the object detection part 31 and the semantic segmentation part 32 are also input into an autonomous emergency braking (AEB) determination processing part 42 that performs processing of determining autonomous emergency braking.

The ACC determination processing part 41 determines a control plan for the vehicle on the basis of the result of the object detection and the result of the semantic segmentation, to acquire a control value for controlling the vehicle. The AEB determination processing part 42 determines a control plan for the vehicle on the basis of the result of the object detection and the result of the semantic segmentation, to acquire a control value for controlling the vehicle. Note that, a comprehensive determination part that comprehensively determines the control plan for the vehicle determined by the ACC determination processing part 41 and the control plan for the vehicle determined by the AEB determination processing part 42 to acquire a control value for the final vehicle control, may be further provided.

As described above, since the recognition result in the object detection task is used for the determination (ACC determination) in the ACC determination processing part 41 and the determination (AEB determination) in the AEB determination processing part 42, switching between a weight for ACC determination and a weight for AEB determination prepared in the neural network for object detection in the object detection part 31, may acquire a recognition result for ACC determination and a recognition result for AEB determination, to output the results to the corresponding determination processing parts.

Similarly, for the semantic segmentation part 32, switching between a weight for ACC determination and a weight for AEB determination prepared in the neural network for semantic segmentation, may acquire a recognition result for ACC determination and a recognition result for AEB determination, to output the results to the corresponding determination processing parts.

In those cases, switching in weight may be made such that the weight for ACC determination and the weight for AEB determination are applied to the same sensor value to acquire the recognition result for ACC determination and the recognition result for AEB determination, respectively, or the switching in weight may be made every time a new sensor value is acquired, for example. Switching in a plurality of types of weights, may be made in accordance with time periods, such as AM/PM, or may be made in response to a country or a zone in which the recognition system 100 is used.

Figure 3:
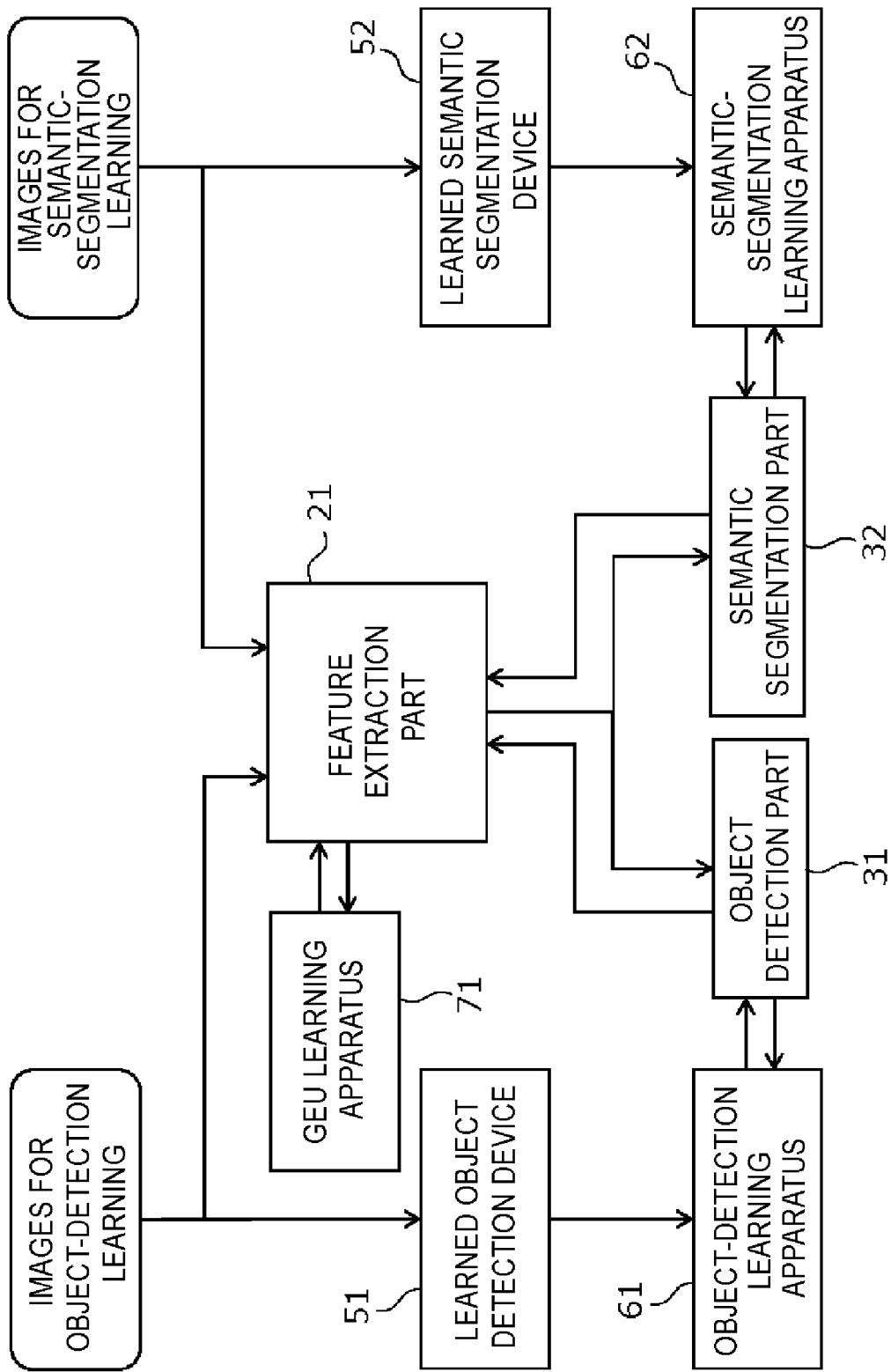
FIG. 3 is a diagram for describing a method of configuring the recognition system according to the embodiment.

Next, a method of configuring the recognition system 100 will be described. FIG. 3 is a diagram for describing the method of configuring the recognition system 100, and is a diagram for particularly describing learning in the generic neural network and each of the neural networks for the specific recognition tasks (according to the present embodiment, the neural network for object detection and the neural network for semantic segmentation).

In each of the specific recognition tasks (the object detection and the semantic segmentation) of the recognition system 100 according to the present embodiment, the recognition processing of classifying the shot image data into a previously prepared recognition-result candidate, is performed, and thus supervised learning is required to be performed.

Typically, a learning data set including input data and a true value to the input data (namely, ideal output data) is required to be prepared for the supervised learning in a neural network. An error back propagation algorithm of acquiring the error between the true value and the output data acquired by inputting the input data into the neural network to learn, and propagating the error back to tune the weight of the neural network, is used in learning.

Similarly to the above, learning is performed in principle in the recognition system 100 according to the present embodiment. Typically, the true value is required to have labeling performed manually. For example, an operator needs to view an image and surround a portion in which a person (a pedestrian) is present, with a frame for person detection, or needs to trace the outlines of any objects on the image for semantic segmentation. Such work is required to be performed to, for example, tens of thousands or hundreds of thousands of pieces of image data for learning. In this manner, work costs for preparing the learning data set for the supervised learning, are excessively large.

According to the present embodiment, as described above, since the generic neural network is shared between the plurality of specific recognition tasks, the generic neural network is required to learn with the respective learning data sets of the specific recognition tasks. If the learning data set of one specific recognition task is only prepared from the plurality of specific recognition tasks, the generic neural network learns with the error back propagation algorithm such that the specific recognition task improves in precision, but the other specific recognition task having no learning data set prepared, does not improve in precision and the precision may degrade. Therefore, the recognition system 100 according to the present embodiment, a learning data set including a large number of combinations between the input value and the true value to the input value, is required for all the plurality of specific recognition tasks.

Thus, according to the present embodiment, for each of the specific recognition tasks, a learned recognition device receives input data to acquire output data and then learning is performed with the input data and the output data as the learning data set. Therefore, the learned recognition device is prepared for each of the specific recognition tasks. According to the present embodiment, the learned recognition device for the object detection task and the learned recognition device for the semantic segmentation task are prepared. The recognition devices each at least include an existing recognition device, and may perform recognition with a neural network or, for example, a support vector machine (SVM).

In this manner, as long as a large amount of input data (image data) is prepared, the use of the learned recognition devices can acquire the output data, instead of labeling the input data manually, and thus the learning can be performed with a combination of the input data and the output data as the learning data set. Such a learning data set is easy to prepare for all the plurality of specific recognition tasks that share the generic neural network. This means that the recognition system 100 including the generic neural network and each of the neural networks for the specific recognition tasks connected in series, according to the present embodiment, comes close to the precision of the learned recognition devices.

As illustrated in FIG. 3, according to the present embodiment, a plurality of images for object-detection learning and a plurality of images for semantic-segmentation learning are prepared. Note that the same images for learning may be used for the images for object-detection learning and the images for semantic-segmentation learning.

The feature extraction part 21 to learn, extracts the generic feature from each of the images for object-detection learning and inputs the generic feature into the object detection part 31 to learn. Meanwhile, a learned object detection device 51 acquires a recognition result (regarded as the true value) from each of the same images for object-detection learning. An object-detection learning apparatus 61 compares the output (the recognition result) of the learned object detection device 51 and the output (the recognition result) of the object detection part 31, to acquire the error of the output of the object detection part 31 to the output of the learned object detection device 51. The object-detection learning apparatus 61 causes the neural network for object detection to learn with the error back propagation algorithm on the basis of the error.

Similarly, the feature extraction part 21 to learn, extracts the generic feature from each of the images for semantic-segmentation learning, to input the generic feature into the semantic segmentation part 32 to learn. Meanwhile, a learned semantic segmentation device 52 acquires a recognition result (regarded as the true value) from each of the same images for semantic-segmentation learning. A semantic-segmentation learning apparatus 62 compares the output (the recognition result) of the learned semantic segmentation device 52 and the output (the recognition result) of the semantic segmentation part 32, to acquire the error of the output of the semantic segmentation part 32 to the output of the learned semantic segmentation device 52. The semantic-segmentation learning apparatus 62 causes the neural network for semantic segmentation to learn with the error back propagation algorithm on the basis of the error.

A GEU learning apparatus 71 propagates both of the error of the output of the object detection part 31 to the output of the learned object detection device 51 and the error of the output of the semantic segmentation part 32 to the output of the learned semantic segmentation device 52, to the feature extraction part 21 to cause the generic neural network to learn.

In this manner, the learned recognition devices (according to the present embodiment, the learned object detection device 51 and the learned semantic segmentation device 52) each regard the output as the true value to prepare the learning data set, and thus the recognition precision of each of the learned recognition devices is desirably high. Thus, an ensemble recognition device that unifies recognition results from a plurality of recognition devices (e.g., acquisition of the average, acquisition of a maximum value, or voting) to acquire a higher-precision recognition result, may be applied to each of the learned recognition devices.

Note that, a learning data set prepared by labeling of a person, may be used in addition to the learning data sets mechanically acquired in this manner.

When no improvement is acquired in precision with the weight vector tuned by each of the prepared learning data sets, the structure of the generic neural network or the structure of the neural network for the specific recognition task is changed. In this case, the recognition system 100 after the change of the structure, the structure of the neural network is changed such that the recognition result acquired with respect to the input data can further approximate to the relationship between the input and the output in the learned recognition device.

Specifically, when both of the specific recognition tasks are insufficient in precision, the structure of the generic neural network is changed, and when one of the specific recognition tasks is sufficient in precision and the other specific recognition task is insufficient in precision, the structure of the neural network for the specific recognition task corresponding to the insufficient precision is changed.

As described above, the recognition system 100 according to the present embodiment, includes: the feature extraction part 21 that performs the processing of extracting the feature; and the recognition processing parts (the object detection part 31 and the semantic segmentation part 32) that each perform the processing dedicated to the specific recognition task to acquire the recognition result, separated from each other, in order to perform each of the specific recognition tasks. The feature extraction part 21 is configured to extract the generic feature to be used in common for the specific recognition tasks. Thus, an advantage in development management is acquired in that development of the generic neural network in the feature extraction part 21 and development of each of the neural networks for the specific recognition tasks, can separately progress in parallel in developing the recognition system 100. The generic neural network in the feature extraction part 21 is shared between the plurality of types of specific recognition tasks, so that development costs can be inhibited.

The GEU 20 including the feature extraction part 21 is provided on the dedicated chip different from those of the SPU 10 and the TSU 30, and the feature extraction part 21 includes the hardware circuit. Thus, calculation of a feature with a large amount of computing particularly in the recognition tasks, can be implemented into hardware. This arrangement allows the power consumption and the heating value to be inhibited low and high-speed feature calculation to be performed. Note that, the implementation of the generic neural network into hardware causes frequent changes or updates to contribute to a disadvantage in cost, but the recognition processing parts each including the software with the general-purpose processor, in the TSU 30, can support the frequent changes or updates.

Since the generic neural network and each of the neural networks for the specific recognition tasks are connected in series, end-to-end learning with an existing neural network learning algorithm, such as the error back propagation algorithm, allows each of the neural networks to learn.

Note that, according to the embodiment, the sensor 11 includes the monocular camera, but a configuration similar to the above configuration, can be applied to recognition processing based on a sensor value from a different sensor. As the different sensor, for example, a GPS receiver that receives a GPS signal to output location information as a sensor value, a stereo camera that shoots two viewpoints to output a stereo image as a sensor value, a millimeter wave radar that emits a millimeter-waveband radiowave and senses the reflected wave thereof to output a distance to an object as a sensor value, a laser scanner that emits a laser beam and senses the reflected light thereof to output the three-dimensional shape of an object as a sensor value, an ultrasonic sensor that transmits an ultrasonic wave and receives the reflected ultrasonic wave to output a distance to an object as a sensor value, a gyroscope sensor that outputs an angular velocity as a sensor value, a temperature sensor that outputs an air temperature as a sensor value, a speed sensor that outputs a speed as a sensor value, or a raindrop sensor that outputs the amount of raindrops as a sensor value, can be adopted.

When a plurality of types of sensors is provided to the vehicle, the SPU 10 may be provided for each of the sensors and the GEU 20 may include a plurality of the feature extraction parts 21 corresponding to the SPUs 10. Furthermore, in the GEU 20, the respective features extracted from a plurality of sensor values from the plurality of types of sensors, may be combined and further input into the neural network to acquire the generic feature.

The feature extraction part 21 in the GEU 20 may similarly perform the switching in weight described above for each of the recognition processing parts.

The preprocessing part 12 in the SPU 10 may encode the sensor values with a neural network.

Note that, the recognition system 100 according to the embodiment, performs two recognition tasks of the object detection task and the semantic segmentation task as the specific recognition tasks, with the generic feature extracted from the same sensor value (the shot image data), but the generic feature extracted from the same sensor value may be shared between three recognition tasks or more.

The present disclosure is effective in a recognition system that performs recognition processing on the basis of a sensor value.

What is claimed is:

1. A recognition system comprising:
a sensing unit configured to perform sensing to output a sensor value;
a task-specific unit including a first recognition processing part that performs a first recognition task based on the sensor value and a second recognition processing part that performs a second recognition task based on the sensor value; and
a generic-feature extraction unit including a generic neural network disposed between the sensing unit and the task-specific unit, the generic neural network being configured to receive the sensor value as an input to extract a generic feature to be input in common into the first recognition processing part and the second recognition processing part,
wherein the generic-feature extraction unit is connected to both the first recognition processing part and the second recognition processing part, and
the generic feature is commonly used in both the first recognition processing part and the second recognition processing part.

2. The recognition system according to claim 1, wherein the generic-feature extraction unit is provided on a semiconductor chip different from a semiconductor chip on which the task-specific unit is provided.

3. The recognition system according to claim 2, wherein the generic neural network in the generic-feature extraction unit includes hardware on the semiconductor chip.

4. The recognition system according to claim 1, wherein the first recognition processing part includes a neural network for the first recognition task that receives, as an input, the generic feature output from the generic-feature extraction unit to output a result of the first recognition task.

5. The recognition system according to claim 1, wherein the sensing unit includes a sensor that acquires the sensor value and a preprocessing part that performs preprocessing to the sensor value.

6. The recognition system according to claim 1, wherein the generic-feature extraction unit includes a discrete device that resolves the input to each layer of the generic neural network, into integer bases.

7. The recognition system according to claim 1, wherein the generic neural network has an integer weight.

8. The recognition system according to claim 1, wherein the generic-feature extraction unit includes a discrete device that resolves the input to each layer of the generic neural network, into integer bases, and
the generic neural network retains a weight discretized having binary numbers or ternary numbers, the generic neural network being configured to perform the entirety or part of internal computing with a logic operation, the generic neural network being configured to transform a result of the logic operation with a non-linear activating function, the generic neural network being configured to give a result of the transformation to a next layer.

9. The recognition system according to claim 1, wherein the generic-feature extraction unit includes a communication module or is connected to the communication module, the generic-feature extraction unit being configured to update the weight of the generic neural network, based on information received by the communication module.

10. A generic-feature extraction unit comprising:
a generic neural network disposed between a sensing unit and a task-specific unit, the sensing unit being configured to perform sensing to output a sensor value, the task-specific unit including a first recognition processing part that performs a first recognition task based on the sensor value and a second recognition processing part that performs a second recognition task based on the sensor value, the generic neural network being configured to receive the sensor value as an input to extract a generic feature to be used in common between the first recognition processing part and the second recognition processing part,
wherein the generic-feature extraction unit is connected to both the first recognition processing part and the second recognition processing part, and
the generic feature is commonly used in both the first recognition processing part and the second recognition processing part.

11. A recognition system configuration method of configuring the recognition system according to claim 1, the recognition system configuration method comprising:
causing the generic neural network to learn with, as learning data sets, input data and output data of a learned recognition device that performs the first recognition task and input data and output data of a learned recognition device that performs the second recognition task.

12. The recognition system configuration method according to claim 11, wherein
an ensemble recognition device that unifies recognition results of a plurality of recognition devices to acquire the output data, is used as each of the recognition devices.

13. A recognition system configuration method of configuring the recognition system according to claim 4, the recognition system configuration method comprising:
causing the neural network for the first recognition task to learn with, as a learning data set, input data and output data of a learned recognition device that performs the first recognition task.

14. The recognition system configuration method according to claim 13, wherein
an ensemble recognition device that unifies recognition results of a plurality of recognition devices to acquire the output data, is used as the recognition device.

15. A recognition system configuration method of configuring the recognition system according to claim 4, the recognition system configuration method comprising:
changing a structure of the generic neural network to cause a relationship between the input into the generic neural network and the output from the neural network for the first recognition task, to further approximate to a relationship between an input and an output of a learned recognition device that performs the first recognition task, and to cause a relationship between the input into the generic neural network and an output from a neural network for the second recognition task, to further approximate to a relationship between an input and an output of a learned recognition device that performs the second recognition task.

16. A recognition system configuration method of configuring the recognition system according to claim 4, the recognition system configuration method comprising:
changing a structure of the neural network for the first recognition task, to cause a relationship between the input into the generic neural network and the output from the neural network for the first recognition task, to further approximate to a relationship between an input and an output of a learned recognition device that performs the first recognition task.

* * * * *